(12) United States Patent
Viens (10) Patent No.: US 7,920,329 B2
(45) Date of Patent: Apr. 5, 2011

(54) EMBEDDED LENS FOR ACHROMATIC WAFER-LEVEL OPTICAL MODULE AND METHODS OF FORMING THE SAME

(75) Inventor: Jeff Viens, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 377 days.

(21) Appl. No.: 12/213,562

(22) Filed: Jun. 20, 2008

(65) Prior Publication Data

US 2009/0316273 A1   Dec. 24, 2009

(51) Int. Cl.
| | |
|---|---|
| G02B 27/10 | (2006.01) |
| G03B 21/56 | (2006.01) |
| G03B 21/60 | (2006.01) |

(52) U.S. Cl. .................. 359/622; 359/443; 359/454
(58) Field of Classification Search .......... 359/618–622, 359/443, 454–455, 626; 264/1.1, 1.32, 2.7
See application file for complete search history.

(56) References Cited

U.S. PATENT DOCUMENTS

| | | | |
|---|---|---|---|
| 5,310,623 A | | 5/1994 | Gal |
| 6,396,636 B2 * | | 5/2002 | Sawaki et al. .................. 359/624 |
| 6,696,220 B2 | | 2/2004 | Bailey et al. |
| 6,849,558 B2 | | 2/2005 | Schaper |
| 6,875,695 B2 | | 4/2005 | Harchanko et al. |
| 7,140,861 B2 | | 11/2006 | Watts et al. |
| 7,221,513 B2 | | 5/2007 | Cho et al. |
| 7,223,619 B2 | | 5/2007 | Wang et al. |
| 7,229,273 B2 * | | 6/2007 | Bailey et al. ................... 425/385 |
| 7,286,295 B1 | | 10/2007 | Sweatt et al. |
| 2004/0061042 A1 * | | 4/2004 | Almogy et al. ............ 250/208.1 |
| 2008/0297906 A1 * | | 12/2008 | Takahashi et al. ............ 359/599 |

OTHER PUBLICATIONS

George A. Riley, PhD., "Wafer-level Nano-optics," FlipChips Dot Com www.flipchips.com/tutorial49.html (originally published in Advanced Packaging, Nov. 2004, pp. 18-25).
John Doering, "An Enabling Technology for Nanoscale Manufacturing: Step and Flash Imprint Lithography (S-FIL ™)," Nano Impact Summit 2005 www.molecularimprints.com/NewsEvents/tech_articles/Nano%20Impact%20Summit%202005.pdf (Presentation slides) 31 pages.

* cited by examiner

Primary Examiner — Dawayne A Pinkney (57) ABSTRACT

A wafer-level optical lens module including one or more embedded lenses and two outer lenses on an outer side of two outermost glass wafers. The embedded lenses may be formed of air or of any material with desired refractive index and dispersion characteristics. The outer lenses may be formed of any material with desired refractive index and dispersion characteristics. This arrangement, with various lenses of the optical module having different refractive indices and dispersions, allows for the formation of a wafer-level optical lens system which corrects for chromatic aberration and astigmatism.

6 Claims, 10 Drawing Sheets

EMBEDDED LENS FOR ACHROMATIC WAFER-LEVEL OPTICAL MODULE AND METHODS OF FORMING THE SAME

FIELD OF THE INVENTION

Disclosed embodiments related to optical lenses and in particular to achromatic wafer-level optical lenses for use in imaging devices.

BACKGROUND OF THE INVENTION

Microelectronic imagers are used in digital cameras, wireless devices with picture-taking capabilities, and many other applications. Mobile phones and personal digital assistants (PDAs), for example, are incorporating microelectronic imagers for capturing and sending pictures. The growth rate of microelectronic imagers has been steadily increasing as they become smaller and produce better images with higher resolution.

Microelectronic imagers include image sensors that typically use charged coupled device (CCD) and complementary metal-oxide semiconductor (CMOS) systems. CCD image sensors have been widely used in digital cameras and other applications. CMOS image sensors are also quickly becoming very popular because they have low production costs, high yields, and small sizes. CMOS image sensors can provide these advantages because they are manufactured using technology and equipment developed for fabricating semiconductor devices.

In practice, imager modules are fabricated in mass rather than individually. Multiple imager dies, each die including a pixel array and associated electronics, are contained on an imager wafer that contains multiple imager dies, and the substrate of the imager wafer is the substrate for the multiple imager dies. During fabrication, backside processes can be conducted substantially concurrently on each imager die on the wafer. Also, lenses may be formed at the wafer level as well, in which a plurality of lens structures, corresponding in location to a plurality of imager dies on an imager wafer, are fabricated on a lens wafer. The lens wafer is attached to the imager wafer with the imager dies and lens structures aligned, allowing plural imager modules to be formed simultaneously. After fabrication, the plurality of imager modules may be separated from the attached wafers into individual imager modules.

Lens systems for microelectronic imagers must be able to correct for various imperfections among imagers, such as chromatic aberration and astigmatism. Chromatic aberration is caused by a lens having a different refractive index for different wavelengths of light, thereby resulting in different wavelengths of light being focused at different positions. One way to correct for chromatic aberration is to increase the focal length of the lens. More commonly, lens systems using two or more lenses having different refractive indices are used to reduce or eliminate chromatic aberration. For example, an achromatic doublet (a lens system having two lenses with different refractive indices) will bring two wavelengths to a common focus, therefore reducing the effects of chromatic aberration, but possibly leaving other wavelengths uncorrected and out of focus.

Known lens systems having two or more lenses that can be used for correcting for chromatic aberration and astigmatism include lens systems that are costly and difficult to produce. Accordingly, there is a need for an optical wafer-level lens that is easily manufactured and corrects for these problems.

DETAILED DESCRIPTION OF THE INVENTION

In the following detailed description, reference is made to the accompanying drawings which form a part hereof, and in which are shown by way of illustration specific embodiments that may be practiced. It should be understood that like reference numbers represent like elements throughout the drawings. These example embodiments are described in sufficient detail to enable those skilled in the art to practice them. It is to be understood that other embodiments may be utilized, and that structural, material, and electrical changes may be made, without departing from the spirit or scope of the invention.

Disclosed embodiments relate to a wafer-level optical module including at least one embedded lens formed between two glass wafers. The embedded lens structure may also be surrounded by two outer lenses formed on the outer side of the two glass wafers. Disclosed embodiments relate more generally to a wafer-level optical module including a plurality of embedded lenses, made of a plurality of optical materials with different refractive indices and optical dispersion characteristics (i.e. Abbe numbers), formed between a plurality of glass wafers bonded together such that the refractive surfaces of the embedded lenses are in optical alignment with each other, wherein every bonding surface can be formed independently by polishing or by imprint lithography, or any appropriate method of forming lens refractive surfaces known in the art. Examples of configurations having one, two and three embedded lenses are show in FIGS. 2F, 4K and 5, respectively. The embedded lenses may be filled with air, or with any material having a desired refractive index and dispersion characteristics. The outer lenses may be made of any polymer material with desired refractive index and dispersion characteristics, which may or may not be the same as that forming the embedded lenses.

This arrangement, with various lenses of the optical module having different refractive indices and dispersion characteristics, allows the formation of an achromatic wafer-level optical lens system for imager modules, thereby correcting for optical aberrations such as chromatic aberration.

Figure 1:
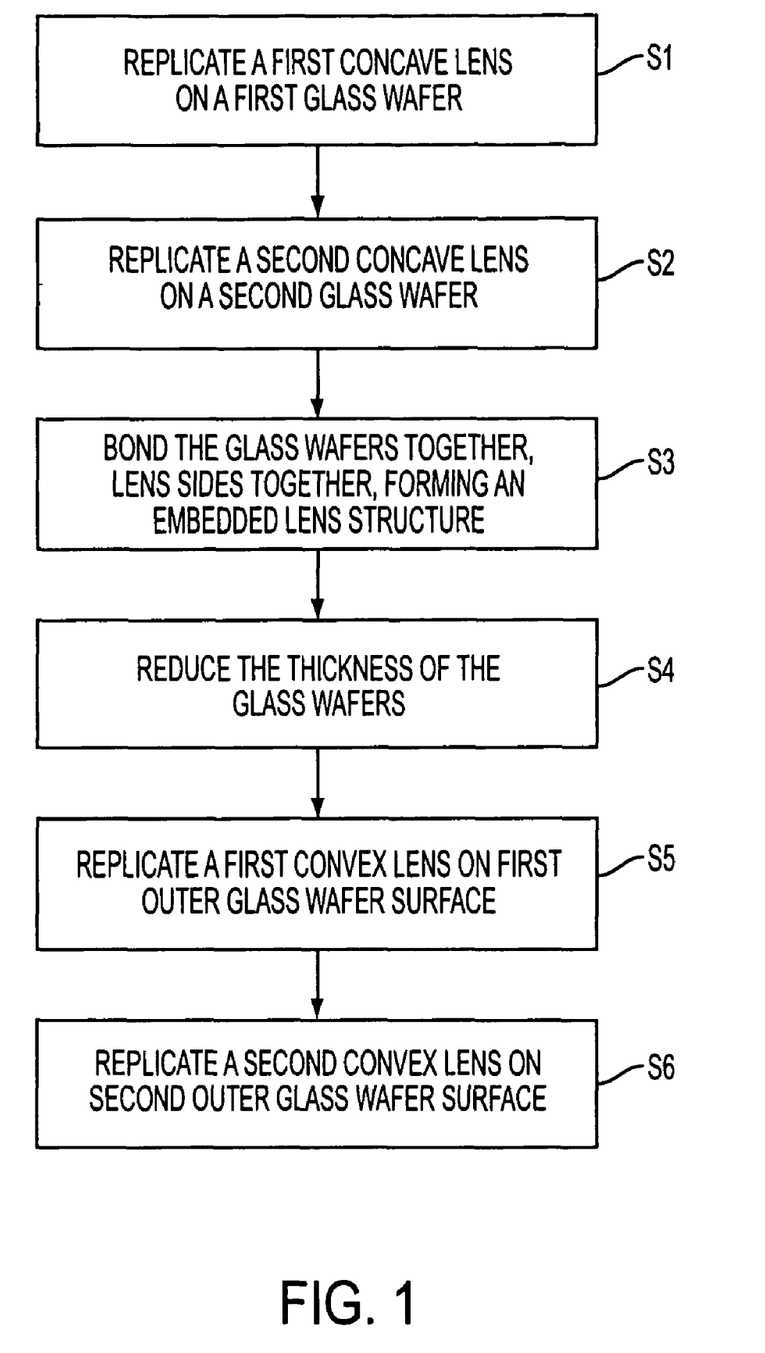
FIG. 1 is a flowchart showing the steps of producing a single embedded lens wafer of a disclosed embodiment.
Figure 2A:
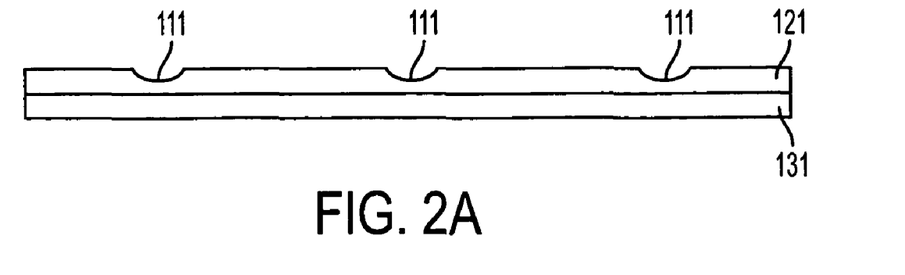
FIGS. 2A-2F illustrate the various stages of production of a single embedded lens wafer of a disclosed embodiment.
Figure 2B:
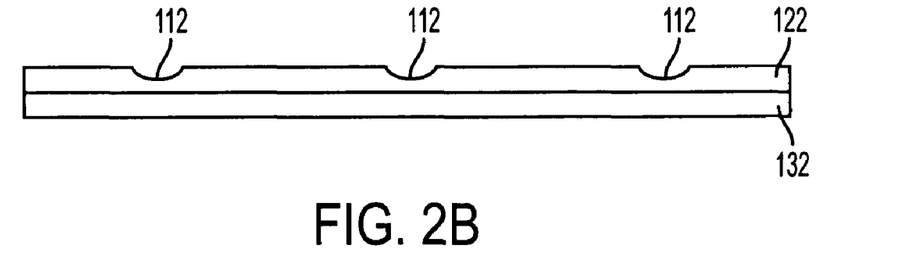
Figure 2C:
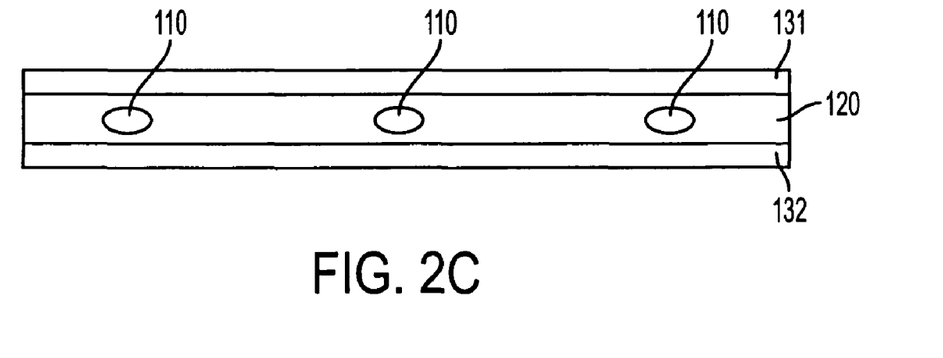
Figure 2D:
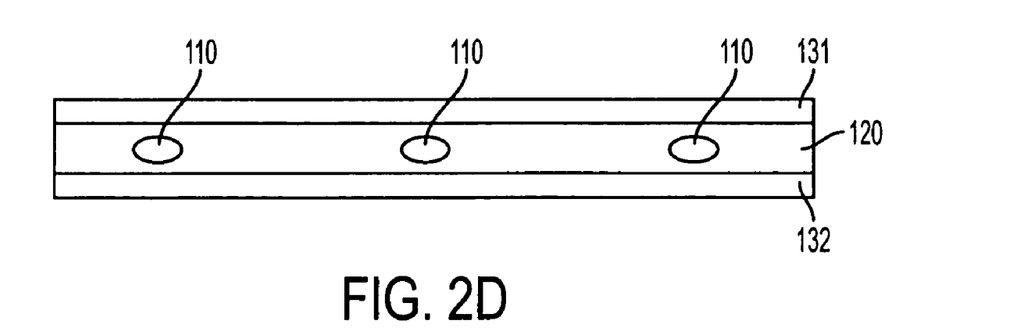
Figure 2E:
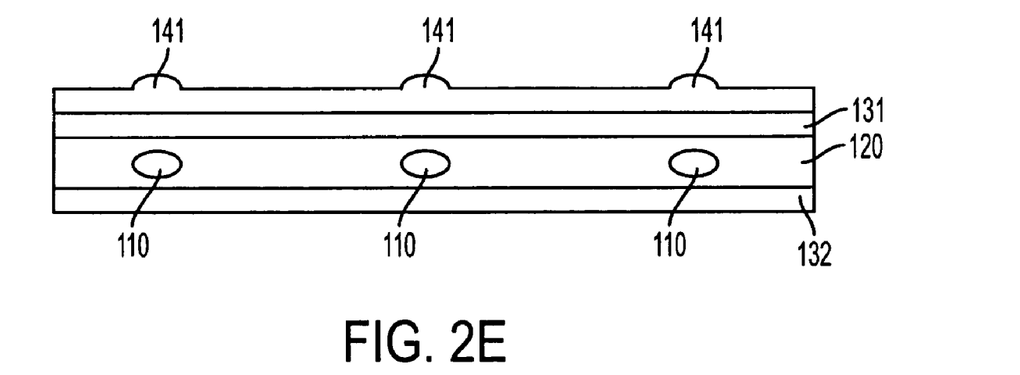
Figure 2F:
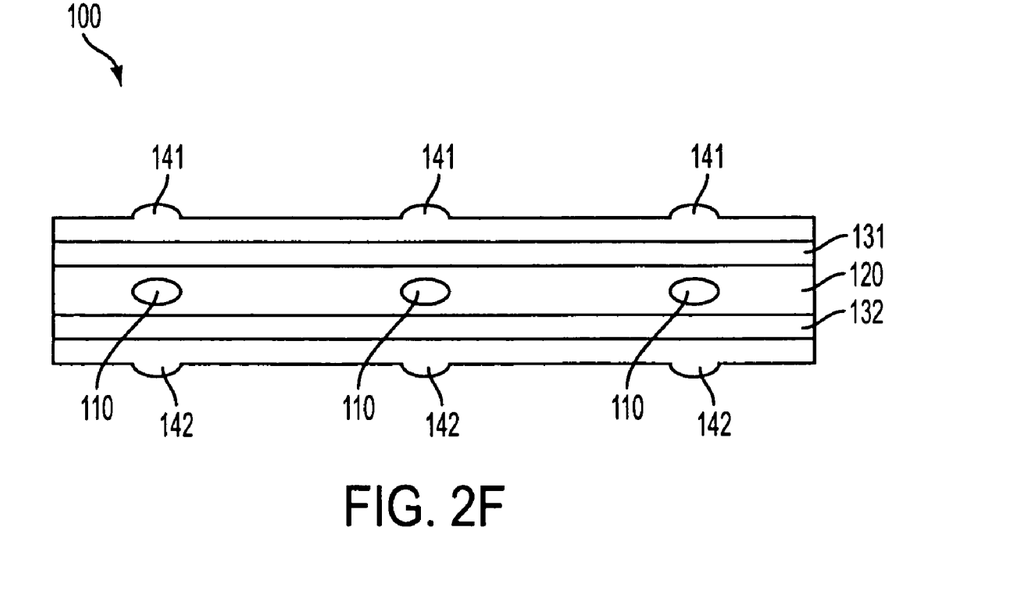
Figure 3:
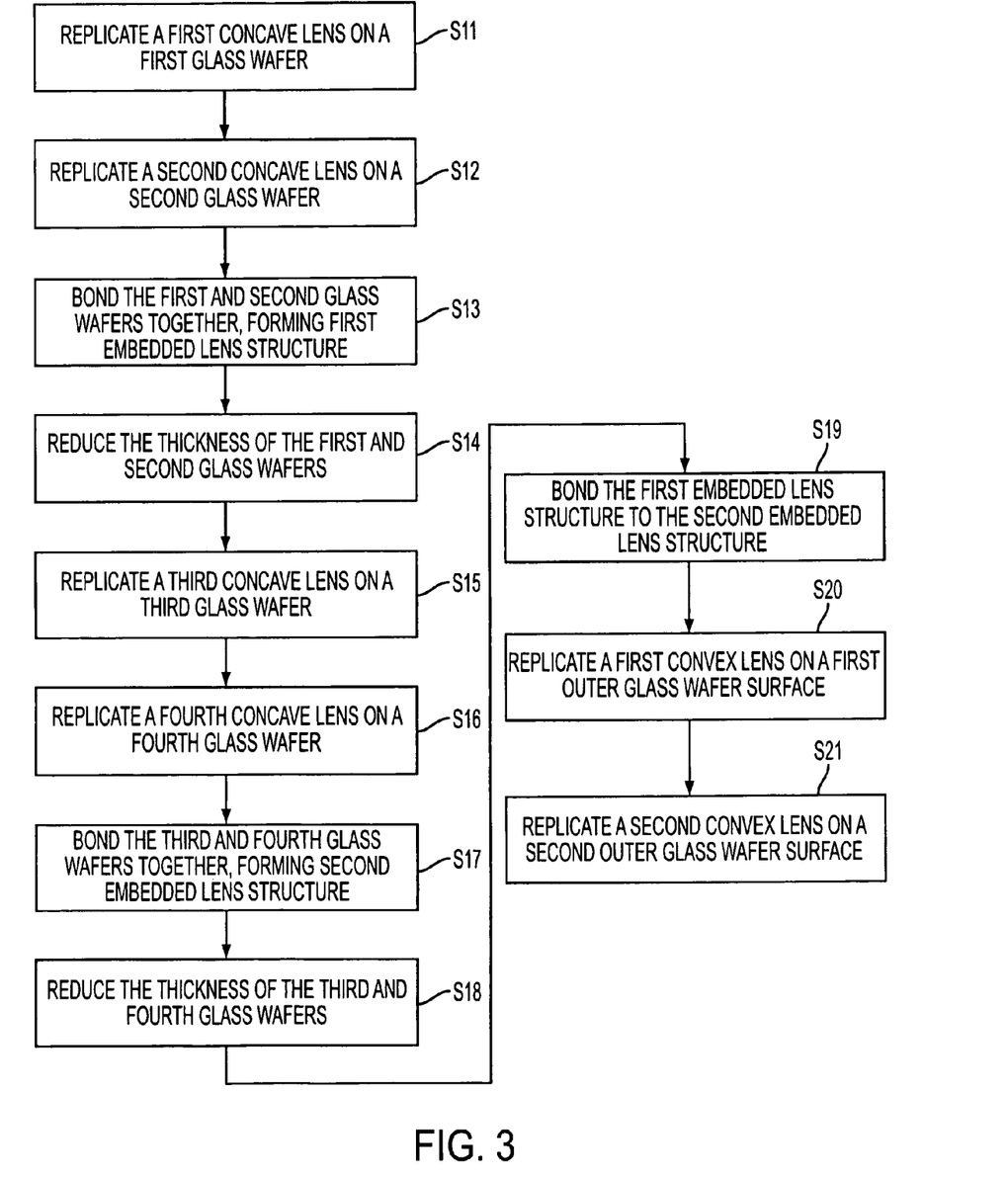
FIG. 3 is a flowchart showing the steps of producing a double embedded lens wafer of a disclosed embodiment.

Referring to FIG. 2F, an embodiment of a lens wafer 100 is now described. The lens wafer 100 includes embedded lenses 110, which are formed within a polymer layer 120, as described in more detail below. Glass wafers 131, 132 are respectively provided on opposing surfaces of the polymer layer 120 and have a thickness of, for example, about 300 µm and may be formed of, for example, transparent silica glass or boro-silica glass. The desired thickness of the glass wafers 131, 132 is a balance between the thickness required to maintain the mechanical strength of the optical module 100 and the thinness necessary to maintain the desired optical properties (e.g., avoiding astigmatism, which can increase with increased thickness of the glass wafers 131, 132). Outer lenses 141, 142 are formed on the outer surfaces of the glass wafers 131, 132.

Referring to FIGS. 1 and 2A-F, a method of fabricating a lens wafer 100 in accordance with a disclosed embodiment is now described. A first lens surface 111 is replicated in a first polymer layer 121 formed on a first glass wafer 131 at step S1 and as shown in FIG. 2A. This may be accomplished using, for example, ultraviolet (UV) nano-imprint lithography or thermal embossing but may be accomplished by any other appropriate method for forming lenses that is known in the art. A second lens surface 112 is replicated in a second polymer layer 122 formed on a second glass wafer 132 at step S2 and as shown in FIG. 2B. This may also be accomplished using, for example, UV nano-technology or thermal embossing. The first and second polymer layers 121, 122 may be a transparent UV curable polymer, a thermoplastic polymer or any other appropriate material. The first and second lens surfaces 111, 112 may be concave or convex, depending on the desired properties of the completed lens. At step S3, the polymer layers 121, 122 are bonded to each other forming polymer layer 120 and embedded lens 110, as shown in FIG. 2C. The space between the first lens surface 111 and the second lens surface 112 forms the embedded lens 110, which may be filled with air, or the same material used to bond the polymer layers 121, 122, or a different material than that used for bonding the polymer layers 121, 122. The bonding material used for bonding the polymer layers 121, 122 may be, for example, an epoxy material or a polymer material. If used as the lens material, the bonding material is chosen, based on the design parameters of the lens wafer 100, as one having the desired refractive index and dispersion characteristics. The bonding may be done, for example, by UV curing or by thermal curing or by any other appropriate method known in the art. Once the two polymer layers 121, 122 are bonded to each other, the thickness of each outer glass wafer 131, 132 is reduced to, for example, less than 300 μm, at step S4 and as shown in FIG. 2D. This may be accomplished, for example, by polishing, grinding or chemical mechanical polishing (CMP) but is not limited to such methods.

Next, at step S5, a first outer lens 141 is formed on the first outer glass wafer 131, as shown in FIG. 2E. Then a second outer lens 142 is formed on the second outer glass wafer 132 at step S6 and as shown in FIG. 2F. The outer lenses 141 and 142 are formed in respective alignment with the embedded lenses 110. The outer lenses may be formed, for example, by replication in a polymer layer (e.g., UV curable or thermoplastic polymers) formed on the outer glass wafer surfaces and using, for example, UV nano-imprint lithography or thermal embossing. This results in the final wafer-level optical lens wafer 100.

By bonding together the two polymer layers 121, 122 at step S3, the glass wafers 131, 132 may be polished to a thickness of less than 300 μm without the need to manipulate very thin and brittle glass wafers. Thin glass wafers are desired in order to obtain low optical astigmatism. Because the wafer of disclosed embodiments is sturdier than other known methods, production is easier and cheaper to accomplish.

It should be noted that the particular configuration of the lens wafer (e.g., the refractive indices and dispersion characteristics of the various lens materials) is dependent on the design parameters of the optical system.

Figure 4A:
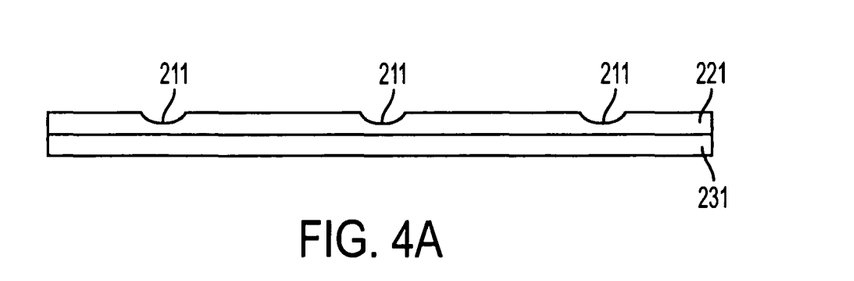
FIGS. 4A-4K illustrate the various stages of production of a double embedded lens wafer of a disclosed embodiment.
Figure 4B:
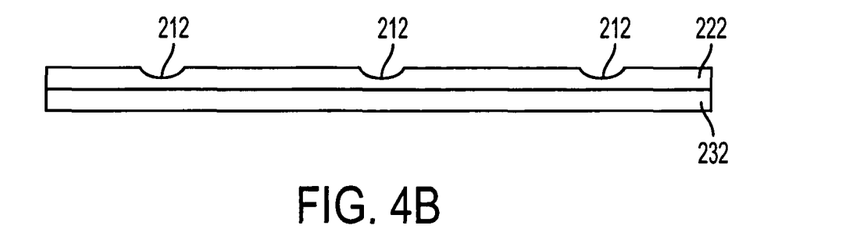

As previously discussed, disclosed embodiments may also include more than a single embedded lens. FIGS. 3 and 4A-4K illustrate a method of fabricating a lens wafer 200 having two sets of embedded lenses 210, 215 (FIG. 4K). A first lens surface 211 is replicated in a first polymer layer 221 formed on a first glass wafer 231 at step S11 and as shown in FIG. 4A. A second lens surface 212 is replicated in a second polymer layer 222 formed on a second glass wafer 232 at step S12 and as shown in FIG. 4B. As previously described, this may be accomplished using, for example, UV nano-imprint lithography, thermal embossing, or any other appropriate method known in the art. Again, the first and second lens surfaces 211, 212 may be concave or convex, depending on the desired properties of the completed lens.

Figure 4C:
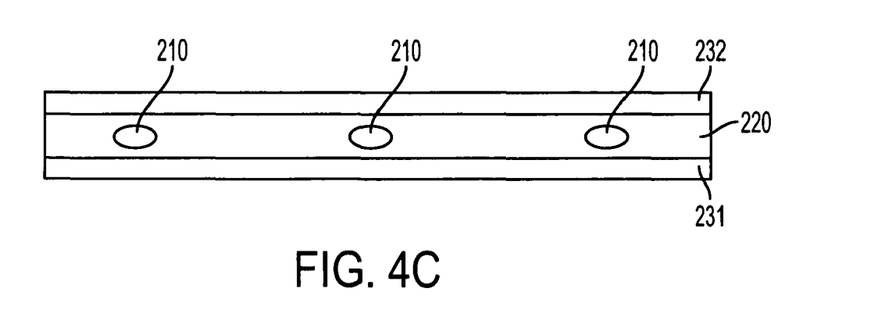
Figure 4D:
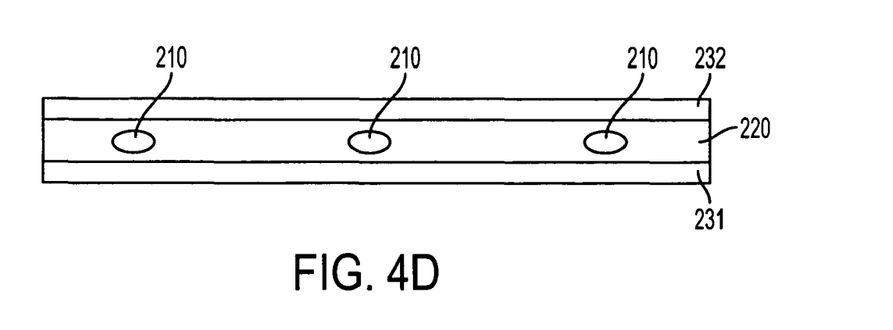

At step S13, the polymer layers 221, 222 are bonded to each other forming polymer layer 220 and embedded lens 210, as shown in FIG. 4C. The space between the first lens surface 211 and the second lens surface 212 forms the embedded lens 210, which may be filled with air, or the same material used to bond the polymer layers 221, 222, or a different material than that used for bonding the polymer layers 221, 222. The bonding material may be, for example, an epoxy material or a polymer material. If used as the lens material, the bonding material is chosen, based on the design parameters of the lens wafer 200, as one having the desired refractive index and dispersion characteristics. The bonding may be done, for example, by UV curing or by thermal curing or by any method known in the art. Once the two polymer layers 221, 222 are bonded to each other, the thickness of each outer glass wafer 231, 232 is reduced to less than about 300 μm, at step S14 and as shown in FIG. 4D. This may be accomplished, for example, by polishing, grinding or chemical mechanical polishing (CMP).

Figure 4E:
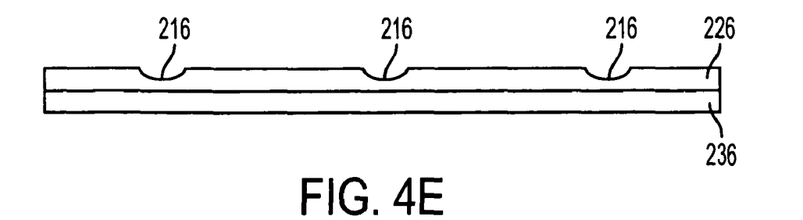
Figure 4F:
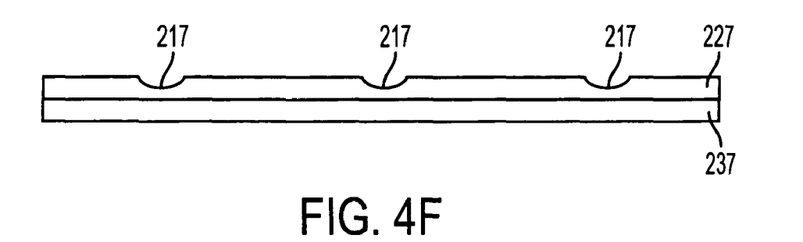
Figure 4G:
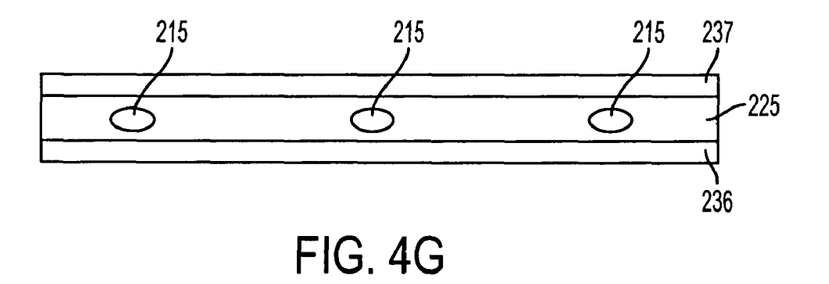
Figure 4H:
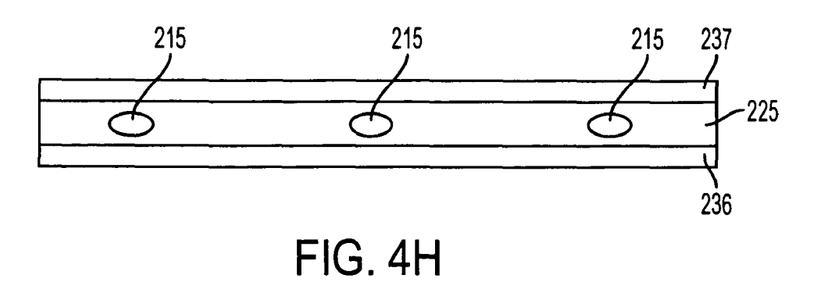

Third and fourth lens surfaces 216, 217 are then replicated in third and fourth polymer layers 226, 227 formed, respectively, on third and fourth glass wafers 236, 237 at steps S15 and S16, and as shown in FIGS. 4E and 4F. The third and fourth lens surfaces 216, 217 may be concave or convex, depending on the desired properties of the completed lens. At step S17, the polymer layers 226, 227 are bonded to each other forming polymer layer 225 and embedded lens 215, as shown in FIG. 4G. Again, the space between the third and fourth lens surfaces 216, 217 forms the embedded lens 215 and it may be filled with air, or the same material used to bond the polymer layers 226, 227, or a different material than that used for bonding the polymer layers 226, 227. Then, the thickness of each outer glass wafer 236, 237 is reduced to, for example, less than about 300 μm, at step S18 and as shown in FIG. 4H.

Figure 4I:
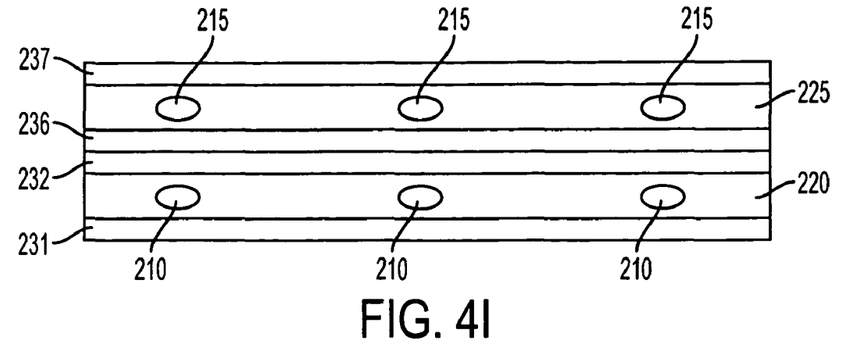
Figure 4J:
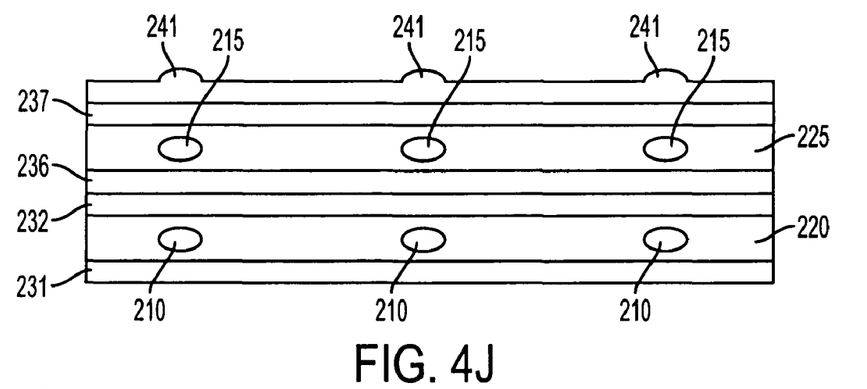
Figure 4K:
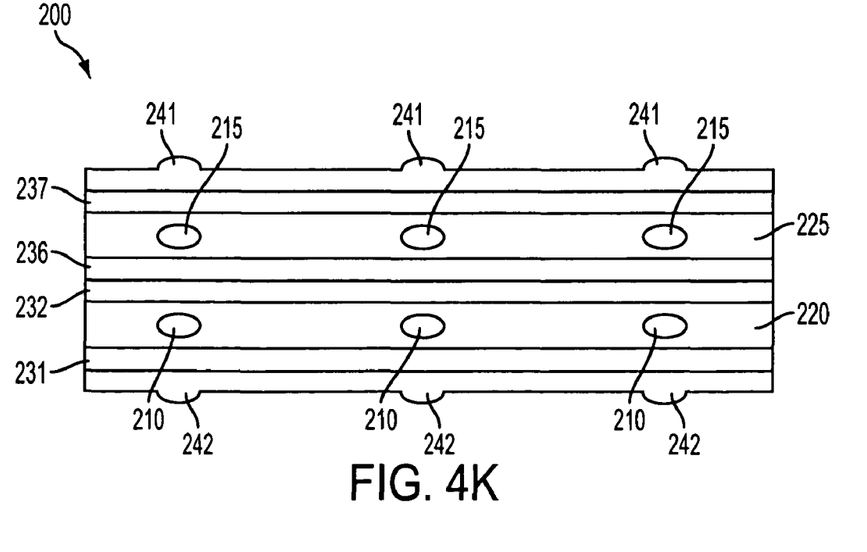

Next, at step S19, the structures including first and second embedded lenses 210, 215 are bonded to each other to form a structure having two sets of embedded lenses 210, 215, as shown in FIG. 4I. The embedded lenses 210, 215 are aligned, respectively, with each other. Then, at step S20, a first outer lens 241 is formed on the fourth outer glass wafer 237, as shown in FIG. 4J. A second outer lens 242 is formed on the first outer glass wafer 231 at step S21, as shown in FIG. 4K. The lenses 241, 242 are formed in respective alignment with the embedded lenses 210, 215. The outer lenses may be formed, for example, by replication in a polymer layer formed on the outer glass wafer surfaces and using, for example, UV nano-imprint lithography or thermal embossing. This results in the final wafer-level optical lens wafer 200.

It should further be noted that disclosed embodiments are not limited to the one and two embedded lens configurations described herein. Depending on the desired design characteristics of the lens, more embedded lens structures may be included by repeating steps S15-S18 the desired number of times and then bonding together all of the embedded lens structures before performing steps S20 and S21.

Figure 5:
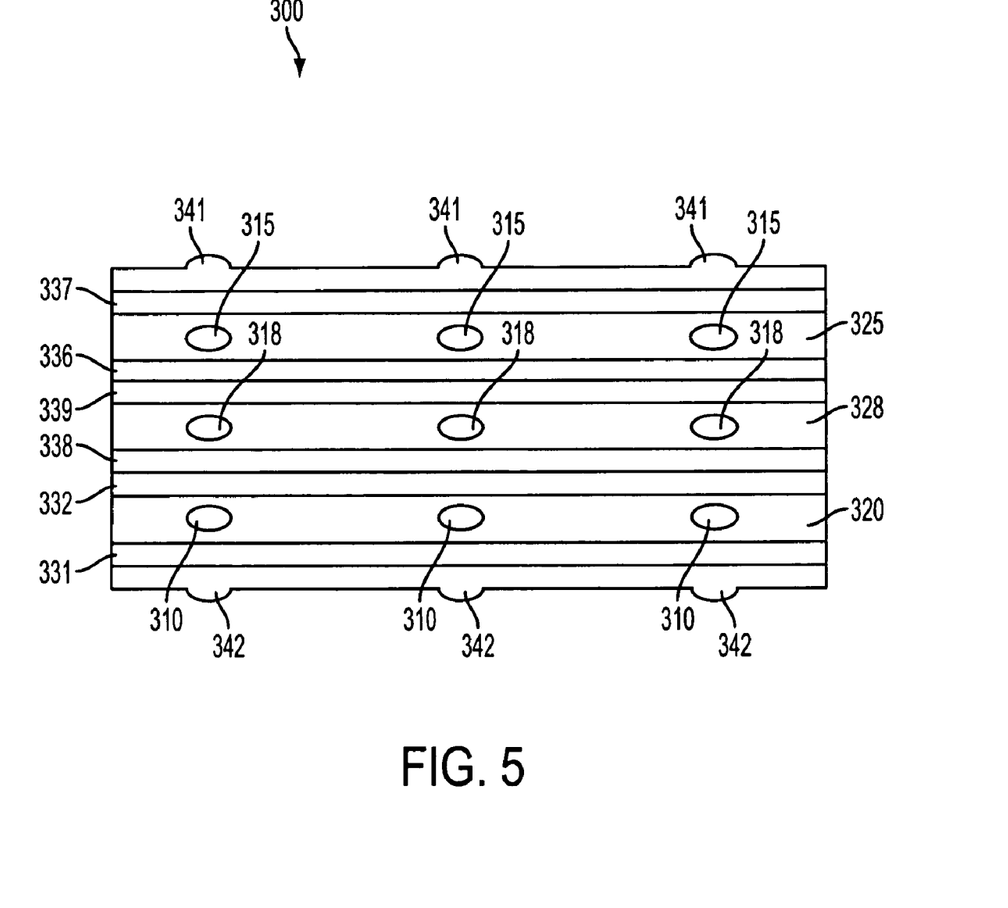
FIG. 5 illustrates a triple embedded lens wafer of a disclosed embodiment.

A three-embedded lens wafer 300 configuration is shown, for example, in FIG. 5. The three-embedded lens wafer 300 includes three structures including embedded lenses bonded to each other. Each structure includes an embedded lens 310, 315, 318 formed of respective lens surfaces replicated in a polymer forming layers 320, 325, 328 and sandwiched between two glass wafers 331 and 332, 336 and 337, 338 and 339. Two outer lenses 341 and 342 are formed on the outer glass wafers 337, 331 in respective alignment with the embedded lenses 310, 315 and 318.

It should be noted that various materials may be used for forming the polymer layers, filling the embedded lenses and for the glass wafers. Any suitable material known in the art having the desired optical characteristics, including refractive index, Abbe number and spectral transparency, may be used and disclosed embodiments should not be limited to the materials discussed herein.

Figure 6:
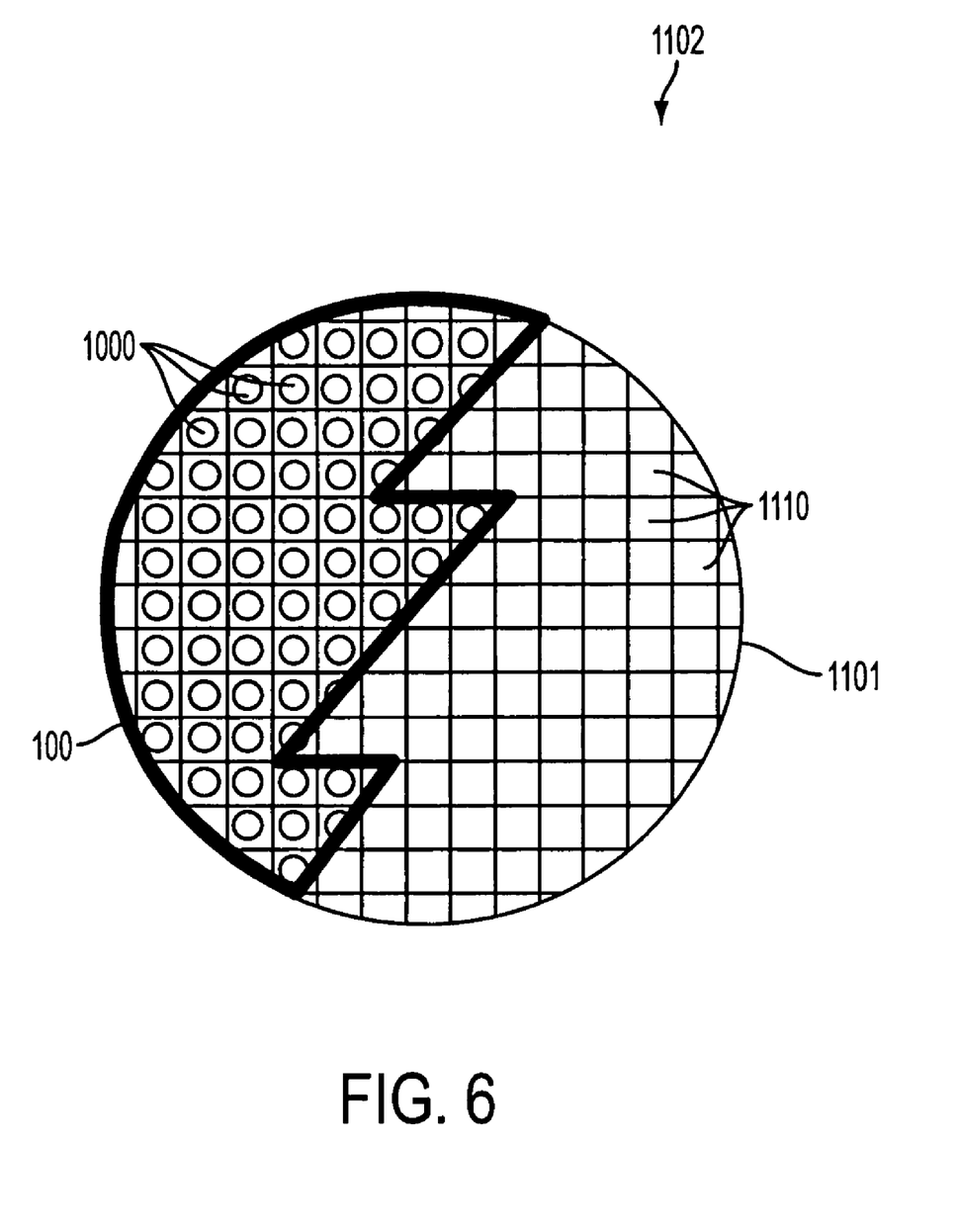
FIG. 6 illustrates a top view of a wafer level imager workpiece including an embedded lens wafer of a disclosed embodiment attached to a wafer including a plurality of imager dies.

After forming the embedded lens wafer of disclosed embodiments, the embedded lens wafer may be attached to a wafer level imager workpiece. FIG. 6 shows a top view of a wafer level imager workpiece 1 102 having a plurality of imager dies 1110 formed on a wafer 1101 and having an embedded lens wafer 100 of disclosed embodiments attached to the wafer 1101, with individual embedded lens modules 1000 corresponding to the individual imager dies 1110. After the embedded lens wafer 100 is attached to the wafer 1101 directly or through an intermediate spacer wafer, the individual imager die 1110/embedded lens 1000 combinations are singulated or separated from each other in a dicing operation to form individual imaging devices.

Figure 7:
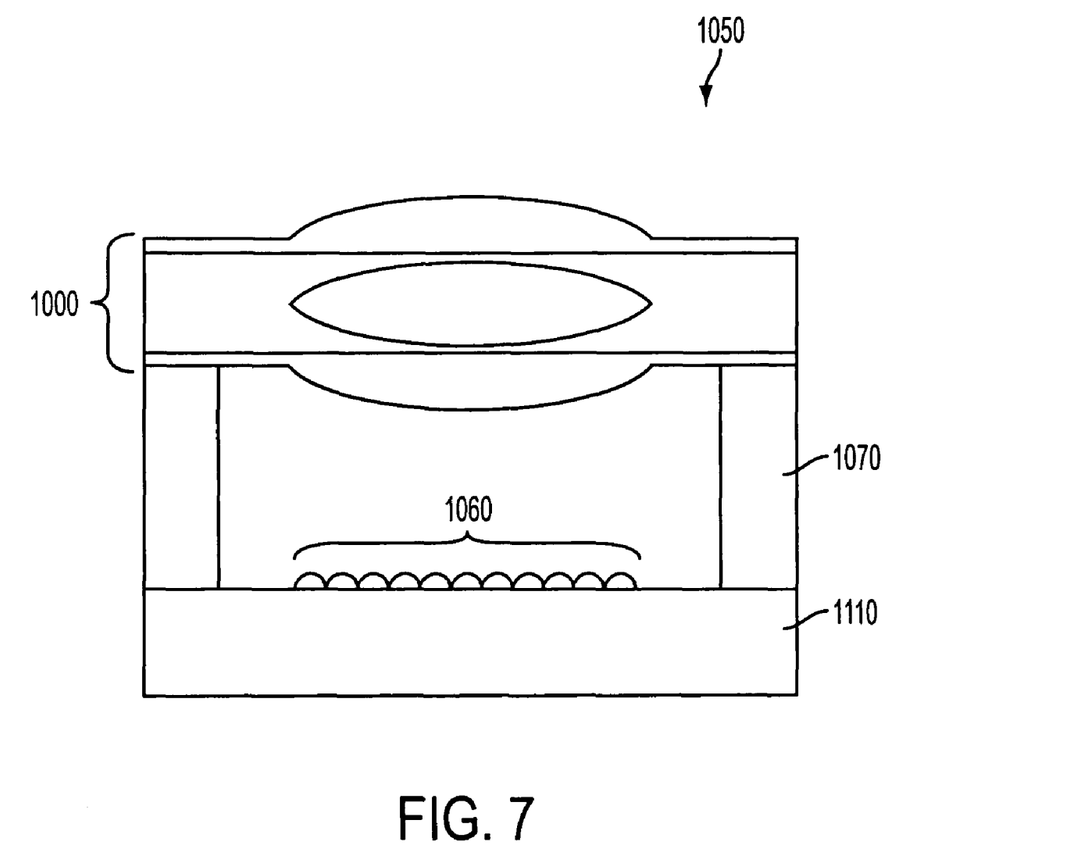
FIG. 7 illustrates an imager module cut from the wafer level imager workpiece of FIG. 6.

FIG. 7 shows an imager module 1050 which is cut from the wafer level imager workpiece 1102 of FIG. 6, and having the optional spacer wafer 1070. The imager module 1050 includes imager die 1110, which includes an imager array 1060 and associated circuits. The imager array 1060 may be a CCD or CMOS imager array, or any other type of solid state imager array. The imager module 1050 also includes an embedded lens structure 1000 of the disclosed embodiments. The spacer wafer 1070 maintains the embedded lens structure 1000 at a proper distance from the imager array 1060, such that a desired amount of light striking the embedded lens structure 1000 is directed through an aperture to the imager array 1060.

Benefits of using the disclosed embodiments in imager systems include low-cost fabrication, scalability and compatibility with semiconductor materials. The disclosed embodiments allow for low cost optics production due to the monolithic structure which allows for ease of processing. The disclosed embodiments may also be scaled in production volume (e.g., wafer level), in the size of the lenses (e.g., microlens to large lens) and in the wavelength of the achromatic correction which is achieved (based on the properties of the materials/layers chosen). Additionally, the disclosed embodiments use materials which are compatible with existing CMOS technologies and imprint processes.

The above description and drawings illustrate embodiments which achieve the objects, features, and advantages described. Although certain advantages and embodiments have been described above, those skilled in the art will recognize that there may be many others. For example, the steps in the methods described in FIGS. 1 and 3 may be performed in different orders or may include variations, such as alternative materials having similar functions.

What is claimed as new and desired to be protected by Letters Patent of the United States is:

1. A wafer-level optical lens module comprising:
    a first plurality of embedded lens structures formed between two first substrates, each embedded lens structure being formed of two optically aligned first inner refractive surfaces formed on respective first substrates and a first refractive material provided between the two first inner refractive surfaces;
    a plurality of refractive surfaces formed on outer surfaces of the respective substrates, wherein the plurality of outer refractive surfaces are optically aligned with the plurality of embedded lens structures;
    a second plurality of embedded lens structures formed between two second substrates, each embedded lens structure being formed of two optically aligned second inner refractive surfaces formed on respective second substrates and a second refractive material provided between the two second inner refractive surfaces, wherein one of the first substrates is bonded to one of the second substrates; and
    a third plurality of embedded lens structures formed between two third substrates, each embedded lens structure being formed of two optically aligned third inner refractive surfaces formed on respective third substrates and a third refractive material provided between the two third inner refractive surfaces, wherein the other of the second substrates is bonded to one of the third substrates, and wherein the outer refractive surfaces are formed on outer surfaces of the other of the first and third substrates.

2. A method of forming a monolithic optical lens wafer comprising the steps of:
    forming a first lens surface on a first substrate;
    forming a second lens surface on a second substrate;
    bonding the first and second substrates, the first and second lens surfaces a first embedded lens structure defined by the first and second lens surfaces and being filled with a first refractive material;
    forming third and fourth lenses on respective outer substrate surfaces, such that the third and fourth lenses are optically aligned with the first embedded lens structure;
    forming a fifth lens surface on a third substrate;
    forming a sixth lens surface on a fourth substrate;
    bonding the third and fourth substrates, the fifth and sixth lens surfaces forming a second embedded lens structure defined by the third and fourth surfaces and being filled with a second refractive material; and
    bonding one of the first and second substrates to one of the third and fourth substrates, such that the first embedded lens structure is optically aligned with the second embedded lens structure, before forming the third and fourth lenses.

3. The method of claim 2, further comprising:
    forming a seventh lens surface on a fifth substrate;
    forming an eighth lens surface on a sixth substrate;
    bonding the fifth and sixth substrates, the seventh and eighth lens surfaces forming a third embedded lens structure defined by the fifth and sixth lens surfaces and being filled with a third refractive material; and
    bonding one of the available first, second, third and fourth substrates to one of the fifth and sixth substrates, such that the third embedded lens structure is optically aligned with the first and second embedded lens structures, before forming the third and fourth lenses.

4. The method of claim 2, further comprising reducing the thickness of the first and second substrates after bonding and before forming the third and fourth lenses.

5. The method of claim 2, further comprising reducing the thickness of the first, second, third and fourth substrates before bonding one of the first and second substrates to one of the third and fourth substrates.

6. The method of claim 3, further comprising reducing the thickness of the first, second, third, fourth, fifth and sixth substrates before bonding one of the first and second substrates to one of the third and fourth substrates and before bonding one of the available first, second, third and fourth substrates to one of the fifth and sixth substrates.

* * * * *